(12) United States Patent
Keller et al.

(10) Patent No.: US 10,785,694 B2
(45) Date of Patent: Sep. 22, 2020

(54) METHOD, NETWORK FUNCTIONS AND A COMPUTER PROGRAM PRODUCT FOR SUPPORTING THE HANDING OVER OF A USER EQUIPMENT, UE, FROM A FIRST TYPE OF RADIO ACCESS TECHNOLOGY, RAT, TO A SECOND TYPE OF RAT

(71) Applicant: Telefonaktiebolaget LM Ericsson (publ), Stockholm (SE)

(72) Inventors: Ralf Keller, Würselen (DE); Bo Burman, Upplands Väsby (SE); George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

(21) Appl. No.: 15/745,453

(22) PCT Filed: Dec. 8, 2017

(86) PCT No.: PCT/EP2017/082057
§ 371 (c)(1),
(2) Date: Jan. 17, 2018

(87) PCT Pub. No.: WO2018/206137
PCT Pub. Date: Nov. 15, 2018

(65) Prior Publication Data
US 2019/0159090 A1 May 23, 2019

Related U.S. Application Data

(60) Provisional application No. 62/503,668, filed on May 9, 2017.

(51) Int. Cl.
*H04W 4/00* (2018.01)
*H04W 36/14* (2009.01)
(Continued)

(52) U.S. Cl.
CPC ........... *H04W 36/14* (2013.01); *H04W 36/12* (2013.01); *H04W 36/30* (2013.01); *H04W 88/02* (2013.01)

(58) Field of Classification Search
CPC ..... H04W 36/14; H04W 36/12; H04W 36/30; H04W 88/02
See application file for complete search history.

(56) References Cited

U.S. PATENT DOCUMENTS 9,247,473 B2 * 1/2016 Zhao ................. H04W 36/32
2009/0247137 A1 * 10/2009 Awad ................. H04M 3/2227
455/418

(Continued)

OTHER PUBLICATIONS

3GPP , "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.1.0, Sep. 2016, 1-379.

(Continued)

*Primary Examiner* — Abdelnabi O Musa
(74) *Attorney, Agent, or Firm* — Murphy, Bilak & Homiller, PLLC

(57) ABSTRACT

A method of initiating a handover of a User Equipment, UE, from a first type of Radio Access Technology, RAT, to a second type of RAT, wherein said UE is attached to a core network via an Access Node, AN, comprised by a Radio Access Network, RAN, utilizing said first type of RAT, wherein said method comprises the steps of transmitting, by said UE, to said AN, measurement data relating to qualities of links between said UE and access nodes in said RAN, receiving, by said UE, an indicator from said AN, wherein said indicator informs said UE that there is a risk of losing connectivity between said UE and said Radio Access Net- (Continued)

work, initiating, by said UE, triggered by said received indicator, a handover in order to access the CN via said second type of RAT.

16 Claims, 5 Drawing Sheets

(51) Int. Cl.
    *H04W 36/12*     (2009.01)
    *H04W 36/30*     (2009.01)
    *H04W 88/02*     (2009.01)

(56) References Cited

U.S. PATENT DOCUMENTS

| | | | | |
|---|---|---|---|---|
| 2010/0290429 A1* | 11/2010 | Wu | ........... | H04W 36/0022 370/331 |
| 2011/0292821 A1* | 12/2011 | Chin | ........... | H04W 36/0066 370/252 |
| 2014/0078898 A1* | 3/2014 | Anchan | ........... | H04W 28/0268 370/230 |
| 2015/0131619 A1* | 5/2015 | Zhu | ........... | H04W 36/0022 370/332 |
| 2015/0319660 A1* | 11/2015 | Helbert | ........... | H04W 36/245 455/436 |
| 2016/0212635 A1* | 7/2016 | Cho | ........... | H04W 92/20 |
| 2016/0219474 A1* | 7/2016 | Singh | ........... | H04W 36/00837 |
| 2018/0139641 A1* | 5/2018 | Costa | ........... | H04W 72/048 |

OTHER PUBLICATIONS

3GPP, "3rd Generation Partnership Project; Technical Specification Group Services and System Aspects; Procedures for the 5G System; Stage 2 (Release 15)", 3GPP TS 23.502 V2.0.0, Dec. 2017, 1-260.

3GPP, "3rd Generation Partnership Project; Technical Specification Group Services and System Aspects; System Architecture for the 5G System; Stage 2 (Release 15)", 3GPP TS 23.501 V2.0.0, Dec. 2017, 1-183.

* cited by examiner

METHOD, NETWORK FUNCTIONS AND A COMPUTER PROGRAM PRODUCT FOR SUPPORTING THE HANDING OVER OF A USER EQUIPMENT, UE, FROM A FIRST TYPE OF RADIO ACCESS TECHNOLOGY, RAT, TO A SECOND TYPE OF RAT

TECHNICAL FIELD

The present invention generally relates to hand overs and, more particularly, to the handing over a User Equipment, UE, from a first type of Radio Access Technology, RAT, to a second type of RAT.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Certain issues may arise in telecommunication networks that exist nowadays. For example, particular services may be invoked for a particular UE, for example in case the UE has actually requested such a service, which may not be supported by the telecommunication network.

Another possible issue may be that the requested service may be provided by the telecommunication network but not within the Quality of Service, QoS, requirements that are required.

In any of these cases, the UE may not, or insufficiently, be serviced. That is, the service may be established for the UE but not with the required QoS, or the service may, in the end, not be established at all.

SUMMARY

It is an object of the present disclosure to provide for a methods for supporting the handing over a User Equipment, UE, from a first type of Radio Access Technology, RAT, to a second type of RAT.

It is another object to provide for network functions for supporting the handing over a User Equipment, UE, from a first type of Radio Access Technology, RAT, to a second type of RAT.

It is a further object to provide for a computer program product containing computer program code, which computer program code facilitates the method according to the present disclosure.

In a first aspect of the invention, there is provided a method of initiating a handover of a User Equipment, UE, from a first type of Radio Access Technology, RAT, to a second type of RAT, wherein said UE is attached to a core network via an Access Node, AN, comprised by a Radio Access Network, RAN, utilizing said first type of RAT.

The method comprises the steps of:
transmitting, by said UE, to said AN, measurement data relating to qualities of links between said UE and access nodes in said RAN;
receiving, by said UE, an indicator from said AN, wherein said indicator informs said UE that there is a risk of losing connectivity between said UE and said Radio Access Network;
initiating, by said UE, triggered by said received indicator, a handover in order to access the CN via said second type of RAT.

It was an insight of the inventors that it may be beneficial if an access node in a Radio Access Network, RAN, can provide an indication to the User Equipment, UE, indicating whether or not a handover may be required. Furthermore, it may be advantageous if the UE initiates the handover procedure on its own based on such a received indicator. As such, the presented method is directed to a User Equipment, UE, initiated handover.

It may be noted that the process of handing over a UE from one network/access technology to another network/access technology may also be referred to using terms other than "handover". For example, in the third Generation Partnership Project, 3GPP, a handover procedure may be referred to as an access transfer, session transfer or a mobility procedure. In the scope of the present disclosure, the term "handover" is used to refer to such a procedure wherein a UE connected to a first network/access technology is transferred to a second network/access technology.

In accordance with the present disclosure, the UE is connected to an Access Node of an Radio Access Network. The Radio Access Network, RAN, is, for example, a Next Generation, NF, RAN for accessing 5G types of core networks or a Long Term Evolution, LTE, RAN for accessing 4G types of core networks.

Upon request of the RAN, or initiated by the UE itself, the UE may transmit measurement data relating to the qualities of links between the UE and access nodes in the RAN. The UE may thus perform measurements not only for the access node to which it is connected, but also to other access nodes in the RAN. Preferably, the RAN instructs the UE to provide the RAN with the measurement values. It may also be advantageous for the UE to include more information with in this instruction that informs the UE what measurements are to be performed and reported to the RAN.

It may happen that the access node, to which the UE is connected, is able to determine that the UE is moving towards a geographical position in which the access node is no longer adequately able to serve the UE. In such a case, that particular access node may check, or determine, whether there is any other access node in the RAN available to which the UE may connect. That is, perhaps there is another access node which is able to serve the UE more adequately.

Such a determination may be based on the measurement data that is received from the UE. The measurement data thus comprises data with respect to the qualities of the links between the UE and a plurality of access nodes in the RAN.

The present disclosure is directed to the situation in which the access node, to which the UE is connected, determines that there is a risk of losing connectivity between the UE and the RAN. This means that the access nodes determines that there is a chance that the UE will get out of reach of the RAN, or that the UE is requesting services that the RAN is not able to serve, or anything alike. Further, the access node may determine that it is not possible for the RAN to handover the access node to another access node, or to another technology, within the RAN to improve the connectivity between the UE and the RAN.

The above entails that there is a risk that the UE will lose connectivity towards the RAN, and the RAN, more specifically the access node, is not by means to improve the situation, for example by instructing a handover. As such, the access node provides an indicator to the UE, wherein the indicator informs the UE that there is a risk of losing connectivity between the UE and the RAN.

Triggered by the indicator, the UE may initiate a handover via a second type of RAT in order to access the core network. It is noted that the RAN may not be able to initiate such a handover, but the UE is able to do so. The UE may initiate the handover to another RAN, i.e. a different RAN.

Following the above, the presented method is advantageous as it enables the UE to initiate a handover between RAT's in case the RAN to which the UE is connected has determined that there is a likelihood that the UE is going to lose connectivity thereto.

Network based mobility may be preferred and UE based mobility, in accordance with the present disclosure, may be initiated if the network, more specifically the RAN, sees the risk of losing connectivity and informs the UE accordingly. This allows the UE to act such that any uninterrupted connectivity is kept with high probability for applications that need it, even across UE-initiated access technology changes.

Multiple use cases exist in which the access node sends the indicator to the UE such that the UE initiates a handover:

Option 2 deployments in coexistence with Option 1 deployments, i.e., New Radio, NR, connected to 5GC in coexistence with Long Term Evolution, LTE, connected to the Evolved Packet Core, EPC, and with support or Inter Radio Access Network, IRAN, handover. The 5G access node, i.e. the gNB, for NR may not know about 2G/3G cells in the neighbourhood and whether LTE is not present or too weak;

From 5G RAN to 4G RAN in case there is no support of IRAT handover (or vice versa) by the RAN;

From 5G to 2G/3G in case there is no suitable 4G coverage, vice versa may be anyway a UE decision, assuming 2G/3G RAN not being updated;

From 5G to WLAN.

Furthermore, in the step of initiating a handover, the UE may access the same or a different Core Network, CN, via said second type of RAT. For example, the CN may change from a 5G core to an Evolved Packet Core, EPC. Alternately, the UE may continue to access the same CN even after the handover procedure.

In an example, the method further comprises the step of:
receiving, by said UE, from said AN a request for providing measurement data relating to qualities of links between said UE and access nodes in said RAN prior to said step of transmitting.

The access node may request the UE to come up with the measurement data relating to qualities of links between the UE and access nodes in the RAN. Further, the access node may determine which of the access nodes the UE is to take into account when construing the measurement data.

The measurement relating to qualities of links may relate to signal to noise ratios, Received Signal Code Power, Reference Symbol Received Power, Reference Signal Received Power, Reference Signal Received Quality, Reference Symbol Received Quality, Received Signal Strength Indicator or anything alike. The UE may perform such measurement on broadcast channels that are utilized by the access nodes.

In another example, the step of initiating comprises initiating a handover in order to access the CN via a second RAN, said second RAN being different from the RAN to which said UE is presently connected.

As mentioned above, the RAN to which the UE is connected may lose connectivity with the UE. This particular RAN may not have the ability to initiate a handover of the UE to a second RAN, i.e. a different RAN. The advantage of this particular embodiment is that a handover can still be established in case the UE initiates it. As such, the RAN provides the indicator to the UE, and, based on the indicator, the UE instructs for the handover to be performed.

In a further example, in the step of initiating a handover, said UE connects to the same CN via said second type of RAT. It may be advantageous for the UE to continue to access the same CN as previously connected to.

In another example, the step of receiving further comprises:
receiving, by said UE, from said AN, a preferred second RAT which said UE can utilize to connect to said core network.

The RAN may transmit, besides the indicator, additional information to the UE like a preferred RAT or anything alike. This improves the likelihood that a handover may be performed successfully.

In a second aspect, there is provided a method of enabling a handover of a User Equipment, UE, from a first type of Radio Access Technology, RAT, to a second type of RAT, wherein said UE is attached to a core network via an Access Node, AN, comprised by a Radio Access Network, RAN, utilizing said first type of RAT.

The method comprises the steps of:
receiving, by said AN, from said UE, measurement data relating to qualities of links between said UE and access nodes in said RAN;
determining, by said AN, that there is a risk of losing connectivity between said Radio Access Network and said UE based on said measurement data;
transmitting, by AN, an indicator to said UE, wherein said indicator indicates a risk of losing connectivity such that said UE is to initiate a handover procedure to said second type of RAT.

In accordance with the present invention, different aspects applicable to the above mentioned examples of the method directed to the Mobility Management node, including the advantages thereof, correspond to the aspects which are applicable to the method directed to the network function, according to the present invention.

In an example, the method further comprising a step of:
transmitting, by said AN, to said UE a request for providing measurement data relating to qualities of links between said UE and access nodes in said RAN prior to said step of receiving.

In another example, the step of transmitting further comprises:
transmitting, by said AN, a preferred second RAT which said UE can utilize to connect to said core network.

In any case, the indicator indicating a risk of losing connectivity may be binary, for example either a "1" or a "0".

The indicator indicating a risk of losing connectivity may have multiple risk levels. The UE may then determine whether it initiates a handover based on the particular risk level.

In a third aspect, there is provided an Access Node, AN, in a Radio Access Network, RAN, arranged for enabling a handover of a User Equipment, UE, from a first type of Radio Access Technology, RAT, to a second type of RAT, wherein said UE is attached to a core network via said AN, comprised by said Radio Access Network, RAN, utilizing said first type of RAT.

The AN comprises:
receive equipment arranged for receiving from said UE, measurement data relating to qualities of links between said UE and access nodes in said RAN;
determine equipment arranged for determining, that there is a risk of losing connectivity between said Radio Access Network and said UE based on said measurement data;
transmit equipment arranged for transmitting an indicator to said UE, wherein said indicator indicates a risk of losing connectivity such that said UE is to initiate a handover procedure to said second type of RAT.

The transmit equipment may further be arranged for transmitting to said UE, a request for providing measurement data relating to qualities of links between said UE and access nodes in said RAN.

The access node may, for example, be a gNB in 5G RAN's or an eNB in 4G RAN's.

In accordance with the present invention, different aspects applicable to the above mentioned examples of the methods, including the advantages thereof, correspond to the aspects which are applicable to the above described access node, according to the present invention.

In a fourth aspect, there is provided a User Equipment, UE, in a communication network wherein said UE is to be handed over from a first type of Radio Access Technology, RAT, to a second type of RAT, wherein said UE is attached to a core network via an Access Node, comprised by a Radio Access Network, RAN, utilizing said first type of RAT.

The UE comprises:
transmit equipment arranged for transmitting to said Access Node measurement data relating to qualities of links between said UE and access nodes in said RAN;
receive equipment arranged for receiving an indicator from said access node, wherein said indicator informs said UE that there is a risk of losing connectivity between said UE and said Access Network;
handover equipment arranged for initiating a handover procedure in order to access the CN via said second type of RAT.

The receive equipment may further be arranged for receiving from said AN, a request for providing measurement data relating to qualities of links between said UE and access nodes in said RAN prior to said step of receiving.

In a fifth aspect, there is provided computer program product containing computer program code which, when executed on a processor of a User Equipment, UE, causes the processor to implement a method according to any of examples as provided above.

In another example, there is provided a computer program product containing computer program code which, when executed on a processor of an access node of a Radio Access Network, RAN, causes the processor to implement a method according to any of the examples as provided above.

In the context of the present invention, a module, device, equipment, or the like may also be implemented as a computer program running on the processor.

The above-mentioned and other features and advantages of the invention will be best understood from the following description referring to the attached drawings. In the drawings, like reference numerals denote identical parts or parts performing an identical or comparable function or operation.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
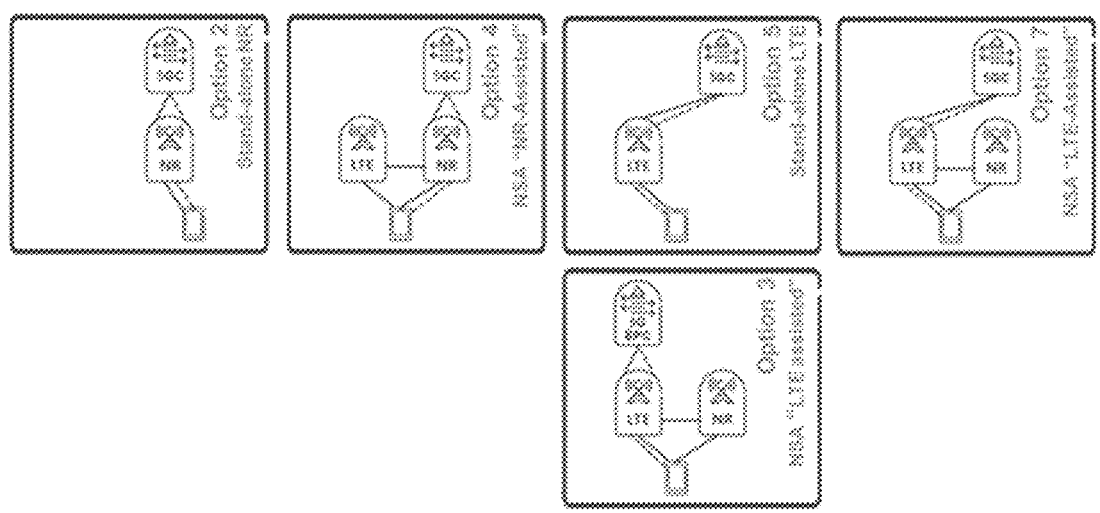
FIG. 1 shows a couple of scenarios in which the Radio Access Network, RAN, is involved.

FIG. 1 shows a couple of scenarios in which the Radio Access Network, RAN, is involved. Standardization work is ongoing on NR as a new radio access and 5GC, 5G Core Network, as a new packet core network. 3GPP RAN has defined a couple of scenarios as depicted in FIG. 1, for which work is either ongoing or planned.

There are additional Options 6 and 8, but neither RAN nor SA2 will work on them. As can be seen by the scenarios depicted in FIG. 1, both LTE and NR will be connected to the NGCN, Next Gen Core Network/5GC. LTE will also connect to EPC partly to serve legacy UEs but also new UEs utilizing Option 3, where NR is anchored in EPC/LTE, i.e. supported as an additional data carrier to LTE.

Figure 2:
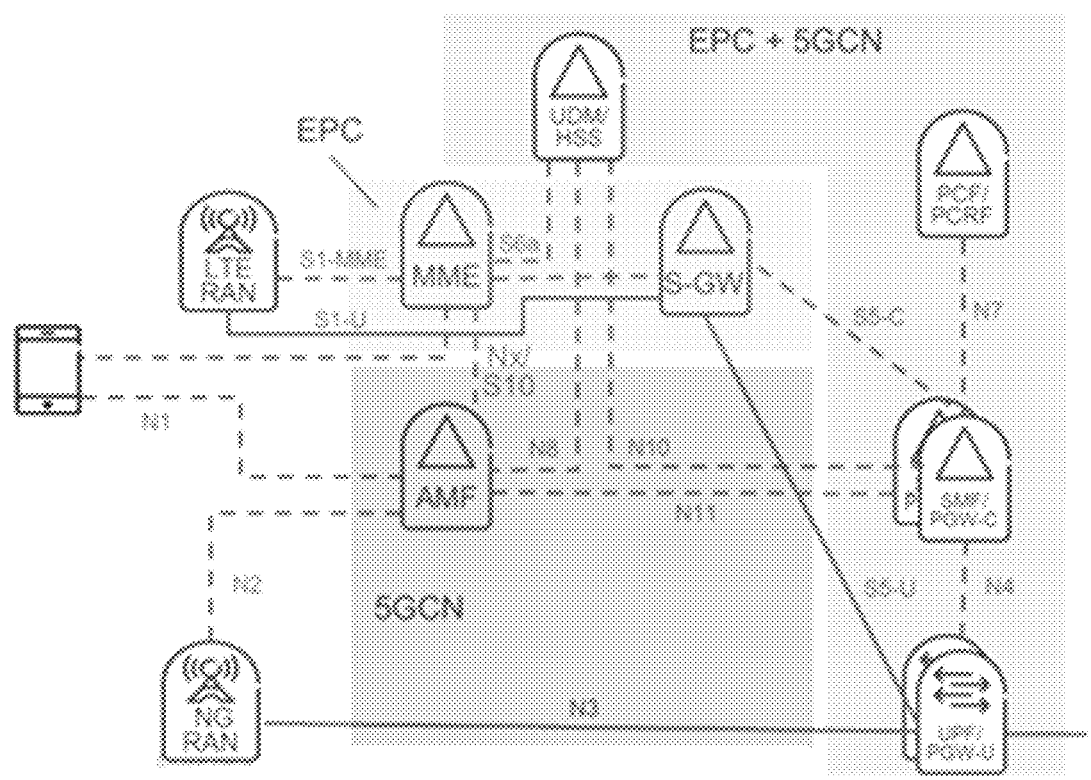
FIG. 2 shows a 5G core network architecture overview, including interworking to Evolved Packet Core.

FIG. 2 shows a 5G core network architecture overview, including interworking to Evolved Packet Core.

The RAN instructs the UE which neighbour cells to measure. The UE provides the measurement reports to the RAN, and then the RAN determines whether there is a need to perform handover to a cell of the same radio technology or to a cell of a different radio technology. Also, Single Radio Voice Call Continuity, SRVCC, from LTE to 2G/3G is normally initiated by an LTE eNB based on measurement reports.

The model shown in FIG. 2 enables that seamless interworking between the two LTE and NR/NG-RAN networks via procedures in EPC and 5GC. This implies, as an example, that a voice call over NG-RAN/5GC can be moved to LTE/EPC when both accesses are voice capable. It implies though that voice QoS is supported on both radio accesses.

There currently exist certain challenges. Currently, it is not possible to initiate a handover from 5G to 4G by the core network. This may be prevented either because the subscriber is not entitled to use voice on 5G, or because the network cannot serve voice, or additional voice, on 5G.

Certain aspects of the present disclosure and their embodiments may provide solutions to these or other challenges. In the following, we describe the solution from a 5G-RAN/5GC perspective interworking with LTE/EPC, but it is equally applicable also for LTE/EPC interworking with 5G-RAN/5GC.

For a Service Based Architecture, SBA, the Access and Mobility Function, AMF, could place a subscription at SMF+PGW-C, PCF or AF that the AMF wants to receive a notification when a service with 5G QoS Indicator, 5QI, for voice is used.

The AMF may only place this subscription when AMF knows the UE is in an area where the gNB does not support QoS required for voice. AMF can always place this subscription when it knows the UE have no subscription for voice in 5GS. When the UE is in an area where the gNB supports QoS required for voice, the AMF may remove the subscription and when the UE is no longer served by the specific AMF, the AMF removes the subscription.

SMF+PGW-C would know that a service with 5QI for voice is used based on QoS rules for voice received from PCF. PCF would know this based on Media Component description received from AF, and AF would know this inherently, e.g. a P-CSCF would know from service identifiers in SIP signalling. When having received the subscription information the SMF+PGW-C, PCF or AF must notify AMF prior to setup of QoS Flow for voice and await a response message from AMF. That SMF+PGW-C, PCF or AF must await a response message from AMF prior to setup of QoS flow could either be indicated by a specific indication in the subscription placed by AMF, or be default for this type of subscriptions. The notification from SMF+PGW-C, PCF or AF must either include an indication that a response from AMF is required, i.e., "please inform me when to progress resource allocation", or the AMF is mandated to always respond to such notifications from SMF+PGW-C, PCF or AF.

When AMF receives a notification of QoS Flow for voice establishment, AMF takes a decision if the QoS Flow can be setup in native access or if the UE should move to 4G by ordering a handover in gNB. AMF could use configured knowledge that the gNBs in the geographic area do not support 5QI for voice. The reason for allowing two sets of decisions is to allow for a greater geographic coverage for subscription than for the actual handover, and thereby optimizing signalling needed in the network. After having sent the Notification (with a possible addition that a response is needed from AMF to progress resource allocation) to the AMF, the SMF+PGW-C, PCF or AF buffers any 5GC signalling that is needed to setup the required QoS Flow.

The AMF responds to the notification from SMF+PGW-C, PCF or AF, since it has either been indicated that a response from AMF is needed in the notification or that such response is mandatory, with a "notification" response message and a cause. The cause could indicate that the QoS Flow setup can proceed, UE was not in an area that requires handover, or it could indicate that the SMF+PGW-C, PCF or AF shall continue to wait with the further setup until confirmation of RAT change to 4G has been received, AMF will order the gNB to perform HO and SMF+PGW-C, PCF and AF have subscribed to be informed about RAT change. Further, a RAT change, a cancellation of the subscription from AMF or an AMF relocation without a new subscription being placed from the new AMF should all allow the SMF+PGW-C, PCF or AF to proceed with the setup of required resources.

Figure 3:
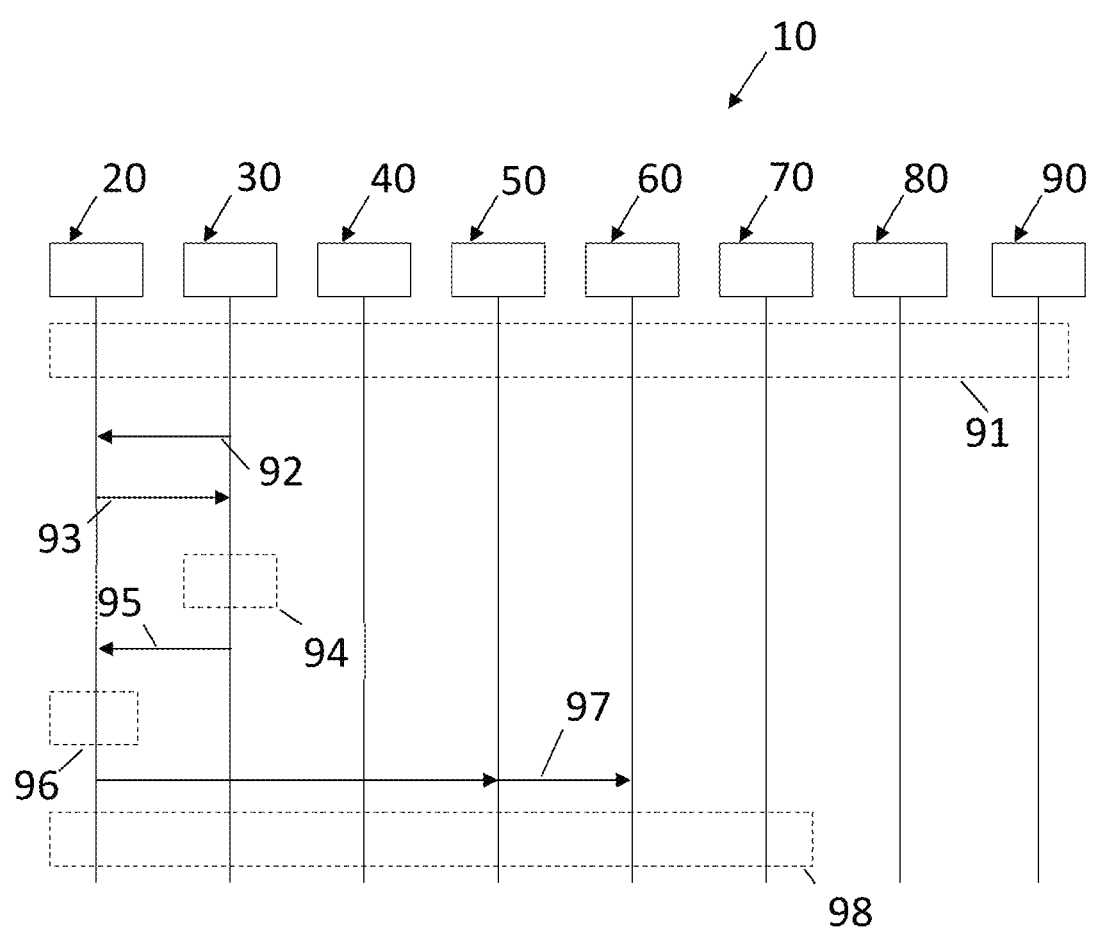
FIG. 3 schematically illustrates a signalling diagram according to the present invention.

There are, proposed herein, various embodiments which address one or more of the issues disclosed herein. Certain embodiments may provide one or more of the following technical advantages. For instance, certain embodiments enable voice-centric UEs to camp on NR/5G-RAN—even if the subscriber is not entitled for voice on 5G or there is no capacity for voice calls—and initiate handover to LTE which is already QoS enabled for voice at call setup (or vice versa). Furthermore, according to certain embodiments, handover to neighbour cell of eNB connected to EPC will be triggered by CN if a service requiring QoS for voice media is initiated. The Handover from 5G to 4G (or vice versa) will be already be initiated prior to resources being allocated in RAN (and in core). Referring now to FIG. 3, reference number 10 schematically illustrates an exemplary signalling diagram according to an embodiment of the present invention. The UE 20 accesses services in a core network by establishing 91 a call or a communication session. Such a process 91 of establishing a communication session is well documented and the person skilled in the art is aware of such a process. While establishing 91 such a communication session, the UE 20 connects to an access network 20. While establishing such a communication session, the UE may also communicate with other nodes/network functions in the network such as the Mobile Switching Centre server, MSC, 40, the Internet Protocol based Multimedia Subsystem, IMS, 50, the Session Management Function, SMF, 70, the Authentication Server Function, AUSF, 80 and/or the Remote end 90.

The Access Network 30 may comprise of a plurality of Access nodes which serve the UE 20. Such an access node is for example, a Base station, or an eNodeB or a gNB. Under normal operational circumstances, the UE 20 is being served by one of a plurality of the Access nodes in the Access network. According to an embodiment of the present invention, the Access network 30, instructs 92 the UE 20 to send measurement reports. These measurement reports may relate to the quality of the connection signal between the UE 20 and the various Access nodes within the Access network 30.

This step of instructing 92 the UE 20 to send measurement reports to the Access network 30 may be performed together at the time of establishing 914 the communication session. Upon receiving an instruction 92, the UE 20 provides 93 the Access network 30 with the requested measurement report. Once the Access network 30 receives the requested measurement report, based on the values indicated in the report, the Access network 30 may decide 94 to indicate to the UE 20 that a handover is to be initiated. The advantage of sending an indicator to the UE 20 is to avoid a scenario wherein both the UE 20 and the Access network take different decisions when signal quality is dropping. Such an indicator is sent to the UE 20 if the access network 30 sees that there is a risk of losing connectivity.

If the access network 30 decides that the UE 20 should be handed over, the access network 30 sends 95 an indicator indicating to the UE 20 that the UE 20 should initiate a handover procedure. Such a hand over may be performed to a different access node in the same access network, or to a different access network 40. In the exemplary signalling diagram shown, a target Access network 40 is shown to which the UE 20 connects. It may also be understood that the UE may also be handed over from one type of access technology to another. Such a different access technology may be utilized to connect to the core network, through the same or different access networks 30, 40.

The indicator may simply be a binary value wherein, for example, a 0 indicates to the UE 20 that there is no risk of losing connectivity and a 1 indicates that there is a risk of losing connectivity. Alternately, the indicator may have multiple possible values. As an example, an indicator may have a "low" value to indicate to the UE 20 that the risk of losing connectivity is low, a "medium" value to indicate to the UE 20 that there is medium risk of losing connectivity and "high" value to indicate to the UE 20 that there is a high risk of losing connectivity. These values are merely exemplary and other options may also be possible.

Along with the indication to hand over the UE 20, the Access network 30, may also send indications as to the preferred Access Node, Access network, or Access Technology to which the UE 20 is to be handed over to. Such additional information may also be contained within the same signalling message 95. In a sense, the Access network 30 may also steer the UE 20 in a desired direction at a time of hand over. In a scenario, wherein the size of the message being sent in signal 95 is critical, it may be envisioned that additional information such as the preferred Access Node, Access Network, Access Technology etc. may be sent to the UE 20 in a separate message. It, however, may be beneficial to send such information immediately before or after transmitting the indicator.

Once the UE 20 receives the indicator from the access network, based on the value of the indicator, the UE 20 decides 96 whether a handover is to be initiated or not. Such a decision may be based, for example, on the value of the received indicator. As an example, if the UE 20 receives a "low" value from the Access Network, it may decide that the risk of losing connectivity is low and hence there is no need to initiate a handover. In such a scenario, the handover procedure may be delayed until a "medium" or "high" value indicator is received. If a "medium" valued indicator is received by the UE 20, the UE 20 may decide to initiate the handover as soon as possible, but may decide to opt for a path without breaking the current communication session. If a "high" valued indicator is received, the UE 20 may hand over the current session immediately and prepare for a break before make scenario, wherein the current communication session is terminated before the UE is completely handed over. This may result in temporary loss of data or interruptions in the current session.

Once the UE 20 takes a decision 96 to hand over the current communication session, it informs 97 the MSC 50 and the IMS 60 about the hand over. Finally, the hand over procedure is terminated 98.

Figure 4:
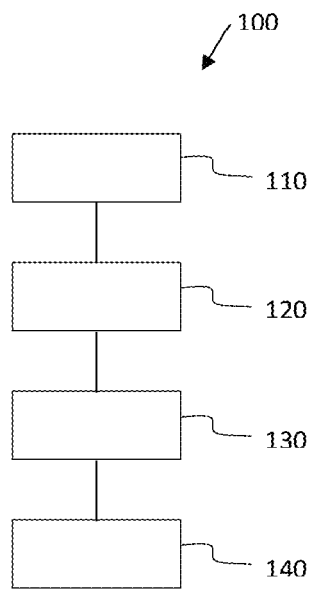
FIG. 4 schematically illustrates a method according to the present invention.

FIG. 4 shows an exemplary method 100 according to the present invention. In a first step 110, the UE receives a request from the Access Network to provide a measurement report. This step is optional and the UE, for example, may provide the measurement reports in a periodic manner. In a step 120, the UE provides the measurement reports to the access network. The report comprises of signal quality measurements of the signal received by the UE from the various nodes in the access network. Subsequently, the UE receives 130 an indicator from the Access network. Based on the indicator received, the UE decides to initiate 140 a handover procedure. Such a handover may be to different access technology or a different access network or both.

Figure 5:
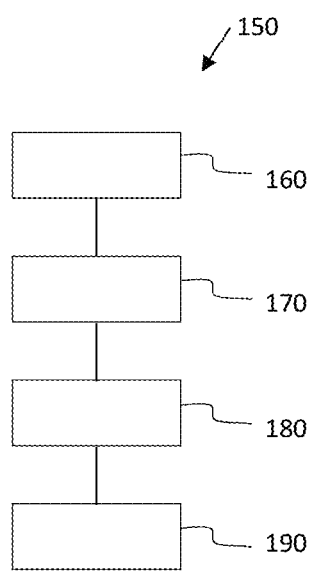
FIG. 5 schematically illustrates a method according to the present invention.

FIG. 5 shows an exemplary method 150 according to the present invention. In a first step 160, the Access network transmits a request to the UE to provide the Access network with measurement reports. As mentioned earlier, such a step is optional as it may be possible that the UE sends such measurement reports periodically. However, in order to minimize unnecessary signalling, the UE may provide the measurement reports only when requested by the Access Network. The Access Network, then receives 170 the measurement report from the UE. Based on this data, the Access network determines 180 whether a handover procedure is to be initiated by the UE. Subsequently, the Access network informs 190 the UE about its decision. Such a decision is informed using a indicator that indicates a risk of losing connectivity to the UE. Such an indicator may be binary or may comprise of more than two values.

Figure 6:
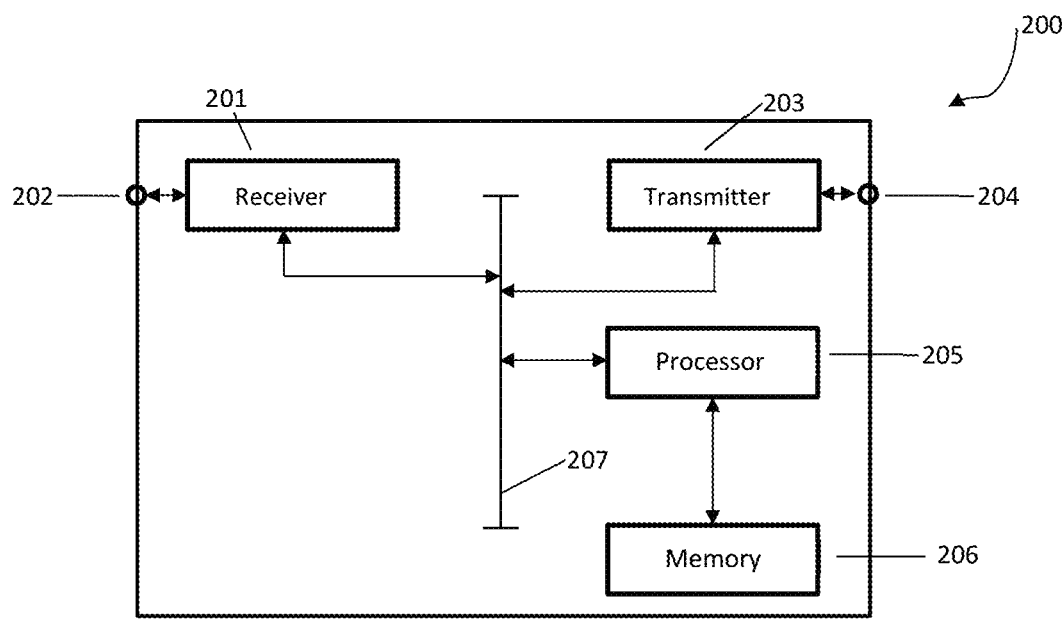
FIG. 6 is a schematic chart illustrating an example of a network element.

FIG. 6 is a schematic chart illustrating an example of a network element 200 such as an access network. The node comprises of receiver 201, 202 to receive messages from other nodes in the communication network. The network element also comprises of transmitter 203, 204 to send messages to other nodes in the communication network. The network element 200 further comprises a processor 205 which is arranged to determine that there is a risk of losing connectivity between the UE and the network based on the received measurement report. The node 200 also comprises a memory 206. All the modules interact with one another and the processor 205 via a communication bus 207. The memory 206 is further arranged to store a computer program product which when executed by the processor 205 performs a method according to the present disclosure.

Figure 7:
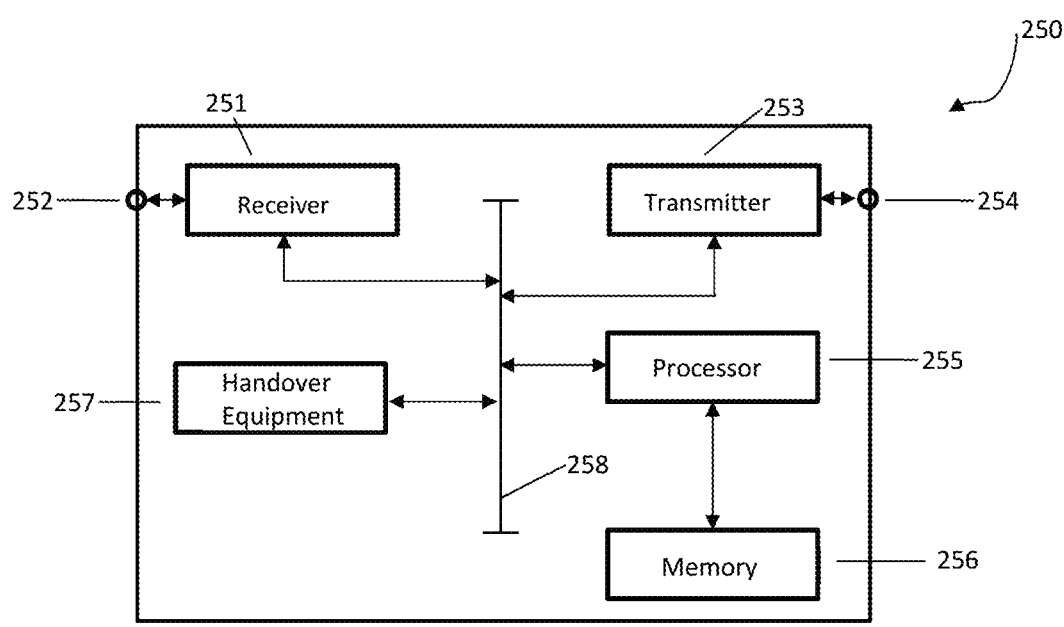
FIG. 7 is a schematic chart illustrating an example of a network element.

FIG. 7 is a schematic chart illustrating an example of a network element 250 such as a User Equipment, UE. The node comprises of receiver 251, 252 to receive messages from other nodes in the communication network. The network element also comprises of transmitter 253, 254 to send messages to other nodes in the communication network. The node also comprises a processor 255 which is arranged for taking a decision of whether or not to initiate handover procedure based on the indicator received from the Access Network. The processor also informs the decision to the handover equipment 257. The node 250 further comprises a handover equipment 257 which is arranged to initiate a handover procedure for the UE 250, based on the decision taken by the processor 255. The node 250 also comprises a memory 256. All the modules interact with one another and the processor 255 via a communication bus 258. The memory 256 is further arranged to store a computer program product which when executed by the processor 255 performs a method according to the present disclosure.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article, "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:
1. A method of initiating a handover of a User Equipment (UE) from a first type of Radio Access Technology (RAT) to a second type of RAT, wherein said UE is attached to a Core Network (CN) via an Access Node (AN) in a Radio Access

Network (RAN) utilizing said first type of RAT, wherein said method comprises the steps of:
- transmitting, by said UE, to said AN, measurement data relating to qualities of links between said UE and access nodes in said RAN;
- receiving, by said UE, an indicator from said AN, wherein said indicator informs said UE that there is a risk of losing connectivity between said UE and said RAN;
- initiating, by said UE, triggered by said received indicator, a handover in order to access a CN via said second type of RAT, in response to said indicator.

2. The method of claim 1, further comprising the step of:
- receiving, by said UE, from said AN a request for providing measurement data relating to qualities of links between said UE and access nodes in said RAN prior to said step of transmitting.

3. The method of claim 1, wherein said step of initiating comprises initiating a handover in order to access the CN via a second RAN, said second RAN being different from the RAN to which said UE is presently connected.

4. The method of claim 1, wherein in the step of initiating a handover, said UE connects to the same CN via said second type of RAT.

5. The method of claim 1, wherein said step of receiving further comprises:
- receiving, by said UE, from said AN, a preferred second RAT which said UE can utilize to connect to said core network.

6. The method of claim 1 wherein said indicator indicating a risk of losing connectivity is binary.

7. The method of claim 1, wherein said indicator indicating a risk of losing connectivity has a value indicating one of a plurality of predetermined risk levels.

8. A method of enabling a handover of a User Equipment (UE) from a first type of Radio Access Technology (RAT) to a second type of RAT, wherein said UE is attached to a core network via an Access Node (AN) in a Radio Access Network (RAN) utilizing said first type of RAT, wherein said method comprises the steps of:
- receiving, by said AN, from said UE, measurement data relating to qualities of links between said UE and access nodes in said RAN;
- determining, by said AN, that there is a risk of losing connectivity between said Radio Access Network and said UE based on said measurement data;
- transmitting, by AN, an indicator to said UE, wherein said indicator indicates a risk of losing connectivity such that said UE is to initiate a handover procedure to said second type of RAT, and wherein said indicator is binary or has a value indicating one of a plurality of predetermined risk levels.

9. The method of claim 8, further comprising a step of:
- transmitting, by said AN, to said UE a request for providing measurement data relating to qualities of links between said UE and access nodes in said RAN prior to said step of receiving.

10. The method of claim 8, wherein said step of transmitting further comprises:
- transmitting, by said AN, a preferred second RAT which said UE can utilize to connect to said core network.

11. An Access Node (AN) in a Radio Access Network (RAN) arranged for enabling a handover of a User Equipment (UE) from a first type of Radio Access Technology (RAT) to a second type of RAT, wherein said UE is attached to a Core Network (CN) via said AN, comprised by said Radio Access Network (RAN) utilizing said first type of RAT, wherein said AN comprises:
- a receiver configured to receive, from said UE, measurement data relating to qualities of links between said UE and access nodes in said RAN;
- a processing circuit configured to determine that there is a risk of losing connectivity between said Radio Access Network and said UE, based on said measurement data; and
- a transmitter configured to transmit an indicator to said UE, wherein said indicator indicates a risk of losing connectivity such that said UE is to initiate a handover procedure to said second type of RAT, and wherein said indicator is binary or has a value indicating one of a plurality of predetermined risk levels.

12. The AN of claim 11, wherein said transmitter is further configured to transmit, to said UE, a request for providing measurement data relating to qualities of links between said UE and access nodes in said RAN.

13. A User Equipment (UE) in a communication network wherein said UE is to be handed over from a first type of Radio Access Technology (RAT) to a second type of RAT, wherein said UE is attached to a core network via an Access Node (AN) in a Radio Access Network (RAN) utilizing said first type of RAT, wherein said UE comprises:
- a transmitter configured to transmit to said AN measurement data relating to qualities of links between said UE and access nodes in said RAN;
- a receiver configured to receive an indicator from said AN, wherein said indicator informs said UE that there is a risk of losing connectivity between said UE and said RAN; and
- a processing circuit configured to initiate a handover procedure in order to access the CN via said second type of RAT, in response to said indicator.

14. The UE of claim 13, wherein said receiver is further configured to receive, from said AN, a request for providing measurement data relating to qualities of links between said UE and access nodes in said RAN, prior to receiving the indicator from said AN.

15. A non-transitory computer-readable medium comprising, stored thereupon, computer program code that, when executed on a processor of a User Equipment (UE) attached to a Core Network (CN) via an Access Node (AN) in a Radio Access Network (RAN) utilizing a first type of Radio Access Technology (RAT), causes the UE to initiate a handover from the first type of RAT to a second type of RAT by:
- transmitting, by said UE, to said AN, measurement data relating to qualities of links between said UE and access nodes in said RAN;
- receiving, by said UE, an indicator from said AN, wherein said indicator informs said UE that there is a risk of losing connectivity between said UE and said RAN;
- initiating, by said UE, triggered by said received indicator, a handover in order to access a CN via said second type of RAT, in response to said indicator.

16. A non-transitory computer-readable medium comprising, stored thereupon, computer program code that, when executed on a processor of an Access Node (AN) of a Radio Access Network (RAN) utilizing a first type of Radio Access Technology (RAT), causes the AN to enable a handover of a User Equipment (UE) attached to a core network (CN) via the AN from the first type of RAT to a second type of RAT, by:
- receiving, by said AN, from said UE, measurement data relating to qualities of links between said UE and access nodes in said RAN;

determining, by said AN, that there is a risk of losing connectivity between said Radio Access Network and said UE based on said measurement data;

transmitting, by AN, an indicator to said UE, wherein said indicator indicates a risk of losing connectivity such that said UE is to initiate a handover procedure to said second type of RAT, and wherein said indicator is binary or has a value indicating one of a plurality of predetermined risk levels.

* * * * *